United States Patent
Kaneko

(10) Patent No.: US 10,766,777 B2
(45) Date of Patent: Sep. 8, 2020

(54) METHOD FOR ELECTROMAGNETIC CASTING OF SILICON IN A CONDUCTIVE CRUCIBLE USING A HIGHEST- AND LOWEST-DISPOSED INDUCTION COIL

(75) Inventor: Kyojiro Kaneko, Osaka (JP)

(73) Assignee: CONSARC CORPORATION, Rancocas, NJ (US)

( * ) Notice: Subject to any disclaimer, the term of this patent is extended or adjusted under 35 U.S.C. 154(b) by 308 days.

(21) Appl. No.: 13/510,386

(22) PCT Filed: Nov. 20, 2009

(86) PCT No.: PCT/JP2009/069685
§ 371 (c)(1),
(2), (4) Date: May 17, 2012

(87) PCT Pub. No.: WO2011/061847
PCT Pub. Date: May 26, 2011

(65) Prior Publication Data
US 2012/0230902 A1    Sep. 13, 2012

(51) Int. Cl.
*C30B 11/00*    (2006.01)
*C01B 33/02*    (2006.01)
*B22D 11/115*    (2006.01)

(52) U.S. Cl.
CPC ............ *C01B 33/02* (2013.01); *B22D 11/115* (2013.01)

(58) Field of Classification Search
CPC ..... C30B 11/00; C30B 11/001; C30B 11/003; C30B 11/006; B22D 11/115
USPC ....... 117/11, 53, 73, 81, 200, 206, 223, 928, 117/931
See application file for complete search history.

(56) References Cited

U.S. PATENT DOCUMENTS

| | | | | |
|---|---|---|---|---|
| 4,915,723 | A * | 4/1990 | Kaneko | ........... B22D 11/11 65/144 |
| 5,066,223 | A * | 11/1991 | Mosch | ........... B22D 27/045 432/161 |
| 5,268,063 | A | 12/1993 | Kaneko et al. | |
| 5,510,095 | A * | 4/1996 | Aratani | ........... B22D 11/11 117/10 |
| 6,695,035 | B2 | 2/2004 | Kimura et al. | |
| 2003/0205358 | A1 | 11/2003 | Kimura et al. | |
| 2007/0006916 | A1 | 1/2007 | Kaneko | |

(Continued)

FOREIGN PATENT DOCUMENTS

| | | |
|---|---|---|
| EP | 0049453 A | 4/1982 |
| EP | 0349904 A2 | 1/1990 |

(Continued)

*Primary Examiner* — Kenneth A Bratland, Jr.
(74) *Attorney, Agent, or Firm* — Philip O. Post

(57) ABSTRACT

This invention aims at providing a silicon electromagnetic casting apparatus for accurate and easy manufacturing of high quality silicon ingots. This apparatus uses a furnace vessel 100, a conductive crucible 200 installed in the internal part of the furnace vessel 100 and an induction coil 300 installed on the outer circumference of the crucible 200. Constant pressure is maintained in the internal part of the furnace vessel 100 using a prescribed gas and the silicon inside the above mentioned crucible 200 is solidified after melting it by induction heating by applying voltage on the induction coil 300. The induction coil 300 is made by placing 2 induction coils 310 and 320 having different induction frequencies one above the other.

5 Claims, 6 Drawing Sheets

(56) References Cited

U.S. PATENT DOCUMENTS

| | | | |
|---|---|---|---|
| 2007/0034146 A1 | 2/2007 | Nakashima et al. | |
| 2007/0039544 A1* | 2/2007 | Kaneko | B22D 11/086 117/81 |
| 2007/0089781 A1 | 4/2007 | Kida et al. | |
| 2008/0210156 A1* | 9/2008 | Sasatani | C30B 11/001 117/81 |
| 2009/0044926 A1 | 2/2009 | Kida et al. | |
| 2009/0321996 A1 | 12/2009 | Kaneko | |

FOREIGN PATENT DOCUMENTS

| | | | |
|---|---|---|---|
| EP | 0450494 A1 | | 10/1991 |
| EP | 0511663 A1 | | 11/1992 |
| JP | 61-232295 A | | 10/1986 |
| JP | 01-264920 A | | 10/1989 |
| JP | 02-030698 A | | 2/1990 |
| JP | 02-051493 A | | 2/1990 |
| JP | 04-219398 A | | 8/1992 |
| JP | 08064354 A | * | 3/1995 |
| JP | 07-196396 A | | 8/1995 |
| JP | 08-064354 A | | 3/1996 |
| JP | 08064354 A | * | 3/1996 |
| JP | 08-229924 A | | 9/1996 |
| JP | 08-310898 A | | 11/1996 |
| JP | 09-014863 A | | 1/1997 |
| JP | 10-053485 A | | 2/1998 |
| JP | 10-053490 A | | 2/1998 |
| JP | 10-101319 A | | 4/1998 |
| JP | 11-011925 A | | 1/1999 |
| JP | 2000-264775 A | | 9/2000 |
| JP | 2001-010900 A | | 1/2001 |
| JP | 2001-019593 A | | 1/2001 |
| JP | 2001-019594 A | | 1/2001 |
| JP | 2004-342450 A | | 12/2004 |
| JP | 2007-051026 A | | 3/2007 |
| JP | 2007-145610 A | | 6/2007 |
| JP | 2007-261832 A | | 10/2007 |
| JP | 2008-156166 A | | 7/2008 |
| JP | 2008-174397 A | | 7/2008 |
| KR | 1999-0052121 | * | 7/1999 |
| WO | 2005/019106 A1 | | 3/2005 |
| WO | 2006088037 A1 | | 8/2006 |
| WO | 2007020706 A1 | | 2/2007 |
| WO | 2009130786 A1 | | 10/2009 |

* cited by examiner

METHOD FOR ELECTROMAGNETIC CASTING OF SILICON IN A CONDUCTIVE CRUCIBLE USING A HIGHEST- AND LOWEST-DISPOSED INDUCTION COIL

TECHNICAL FIELD

This invention relates to a silicon electromagnetic casting apparatus used to manufacture silicon ingots for silicon substrates used mainly in solar cells.

BACKGROUND ART

The use of solar cells is becoming widely used as a measure to tackle the global environmental issues. By virtue of the abundant resources and high efficiency of photoelectric conversion, majority of the solar cells are manufactured by using silicon crystals. Among them, production of solar cells using polycrystalline silicon substrates manufactured by electromagnetic casting method is increasing.

In this method of electromagnetic casting of silicon, as shown in FIG. 5, a copper crucible 200 in which a coolant is circulated and an induction coil 300' arranged on the outer surface of the copper crucible 200 are used in a furnace vessel 100 to levitate a silicon mass S in the copper crucible 200 under the electromagnetic force and the silicon mass S is solidified by continually pulling it downwards thereby to obtain a cast silicon ingot.

Accordingly, since the levitation melting of the silicon mass S is carried out in the copper crucible 200 using electromagnetic force, molten silicon S' does not come into contact with the inner surface of the crucible 200, whereby the contamination of the molten silicon S' by impurities coming from the crucible 200 can be avoided. Also, since the crucible 200 used for levitation melting of the silicon mass S does not come into contact with the molten silicon, the crucible is not damaged and can be used permanently.

Thus, the silicon electromagnetic casting mentioned above has become one of the commercial manufacturing methods which provides a high productivity by manufacturing long silicon ingots continuously, high quality and homogeneity by virtue of stable and regular casting conditions.

DISCLOSURE OF THE INVENTION

Problems to be Solved by the Invention

However, the following problems arose in such silicon electromagnetic casting. More specifically, when the size of silicon mass S is enlarged in breadth in order to increase the productivity, the electrical power input required for melting the increased quantity of silicon in induction melting also increases. Simultaneously, the width of the copper crucible 200 increases and so does the width of the induction coil 300'. As a result, the electric power load on the induction coil 300' increases, and, if equal induction frequency is maintained, the terminal voltage of the induction coil 300' increases in order to meet the increased electric power requirement.

For example, if the induction melting is carried out on a 20 cm wide silicon mass S with 2 turns of the induction coil 300' and the induction frequency maintained at 35 kHz, approximately 250 kW of induction power output is required and the terminal voltage of the induction coil 300' becomes approximately 550 volt. However, if the induction melting is carried out on a 35 cm wide silicon mass S with 2 turns of the induction coil 300' and the induction frequency maintained similarly at 35 kHz, approximately 450 kW of induction power output is required and the terminal voltage of the induction coil 300' becomes approximately 1000 volt.

Here, we came across a problem. In order to prevent the oxidation of the molten silicon S' in the silicon electromagnetic casting, the internal part of the furnace vessel 100 is filled with inert gas of 1 atmospheric pressure. Argon, Helium, etc. can be used as inert gases, but due to economic reasons, argon gas is usually used. However, since the ionization voltage of argon gas is low, when an electric voltage is applied across the conductive bodies facing each other within the furnace vessel 100 which is filled with argon gas, arc discharge is easily formed between the conductive bodies. Usually, with industrial equipments for induction melting, an arc discharge is usually formed when a voltage of 600 volts or more is applied to the adjacent conductive bodies in an argon atmosphere of less than 1 atmospheric pressure. When a powerful arc discharge becomes formed with increase of the voltage between the conductive bodies, the surface of the conductive bodies is caused to be molten and even vaporized.

Generally, in order to increase the inductive output in the electromagnetic casting, the output is increased by increasing the terminal voltage of the induction coil 300' to thereby increase the electric current. The terminal voltage applied to the induction coil 300' generates electric current in the induction coil 300', which in turn induces a voltage on the surface of the cooled cupper crucible 200 placed inside the induction coil 300' by electromagnetic induction and generates electric current. The electric current generated in the copper crucible 200 further generates voltage on the surface of the silicon mass S in the copper crucible 200 through electromagnetic induction.

Thus, when the 35 cm wide silicon ingot mentioned above was intended to be manufactured, the terminal voltage of the induction coil 300' increased, the voltages generated on the surface of the crucible 200 and the molten silicon S' by electromagnetic induction increased and, as shown in FIG. 6, an arc discharge A was formed between the surface of the crucible 200 and the surface of the molten silicon S' facing each other. The surface of the cooled crucible 200 was molten and vaporized due to the heat generated through the arc discharge A, resulting in the creation of a deep groove and increased corrosion with the lapse of time.

When the surface of the crucible 200 is molten and vaporized due to the arc discharge A, the copper of the crucible 200 enters the molten silicon S', the purity of the cast silicon ingot decreases significantly and so does the diffusion length of the semiconductor minority carrier. This decrease in the minority carrier of the silicon ingot affects the efficiency of photoelectric conversion of the solar cells.

Also, when the corrosion of the surface of the crucible 200 increased due to the arc discharge A, a deep groove appeared on the even surface, normal electromagnetic function in the microscopic region of the surface was hindered and anomalies were seen in the melting and solidification processes in electromagnetic casting. Due to this problem, the normal casting process experienced frequent interruptions.

This invention takes into account the above mentioned problems and aims at providing a silicon electromagnetic casting apparatus for accurate and easy manufacturing of high quality silicon ingots.

Means for Resolving the Problems

This invention, in order to achieve the above mentioned objective, provides a silicon electromagnetic casting apparatus including a furnace vessel, a conductive crucible installed within the furnace vessel and an induction coil element arranged on the outer circumference of the crucible, wherein the inside of the furnace vessel is maintained at a constant pressure with a predetermined gas, and a voltage is applied to the induction coil element to induction-heat and melt the silicon in the crucible and thereafter the silicon is solidified, characterised in that the induction coil element comprises multiple coils having different induction frequencies one above another.

With this construction, since multiple coils of different induction frequencies are used, a very high inductive output can be obtained as the total output of all induction coils by keeping the terminal voltage of induction coils of each induction frequency below a predetermined voltage (e.g. 900 volts or less and preferably 600 volts or less) through a selective combination of the induction frequencies applied to each induction coil and the inductive output.

It is preferable that, among the coils of different induction frequencies mentioned above, the coil installed at the lower part is of higher induction frequency. As for the selection of the induction frequency, the induction frequency of the lower induction coil should be selected as a necessary condition for manufacturing high quality silicon ingots, more specifically, the higher frequency inductive output required for the exothermic effect on the solid ingot and for suppression of stirring of the molten silicon. As regards the induction coil placed at the upper part, since this induction coil is positioned away from the solidification interface, the effect of the induction frequency cannot easily spread to the solidification interface and this suppresses the formation of arc discharge inside the crucible, while efficiently increasing the total output of all induction coils.

It is preferable that the induction frequency of the above mentioned induction coil placed at the lower part is at least 25-30 kHz. Consequently, the high frequency inductive output required for the exothermic effect on the solid ingot and for suppression of the stirring of molten silicon can be efficiently increased with the high frequency induction coil placed at the lower part.

It is preferable that a magnetic shield is installed between each of the coils of different induction frequencies mentioned above. This can prevent unnecessary electromagnetic action between the respective induction coils.

It is preferable that the terminal voltage applied to each of the induction coils is 900 volts or less. By doing so, the voltage on the molten silicon surface can be kept at 600 volts or less from standpoint of the induction efficiency.

It is more preferable that the terminal voltage applied to each of the induction coils is 600 volts or less. By doing so, the voltage on the molten silicon surface can be accurately kept at 600 volts or less.

It is preferable that a plasma torch is installed on top of the above mentioned crucible and the molten silicon inside the crucible is subjected to plasma jet heating with the plasma torch. Thus, the melting heat required to melt the silicon mass in the crucible can be supplied efficiently.

Effects of the Invention

According to this invention, since multiple induction coils of different induction frequencies are used, a very high inductive output can be obtained as the total output of all induction coils by keeping the terminal voltage of each of the induction coils of respective induction frequencies below a predetermined range (i.e. 900 volts or less and preferably 600 volts or less) through a selective combination of the induction frequencies applied to respective induction coils and the inductive output. Hence, accurate and easy manufacturing of high quality and wide silicon ingots is made possible.

DESCRIPTION OF THE SYMBOLS

Figure 1:
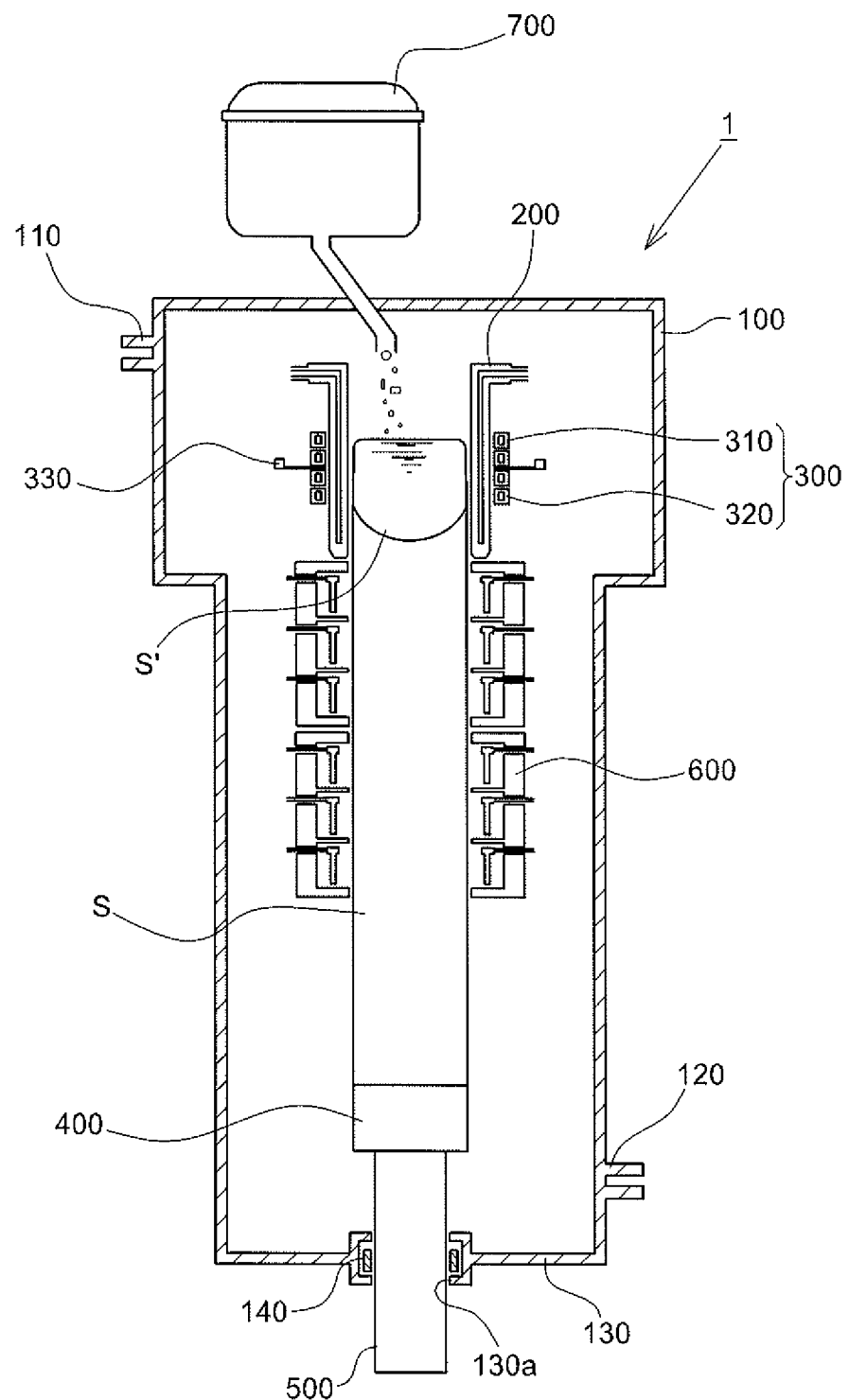
[FIG. 1] is a schematic view of the structure of the first embodiment of the apparatus according to the invention.

1 . . . The apparatus
100 . . . Furnace vessel
200 . . . Crucible
300 . . . Induction coil
310 . . . Induction coil on the upper side
320 . . . Induction coil on the lower side
330 . . . Magnetic shield
400 . . . Graphite support
500 . . . Vertical motion device
600 . . . Temperature control furnace
700 . . . Raw material supply unit

BEST MODE FOR CARRYING OUT THE INVENTION

Embodiment 1

Figure 2:
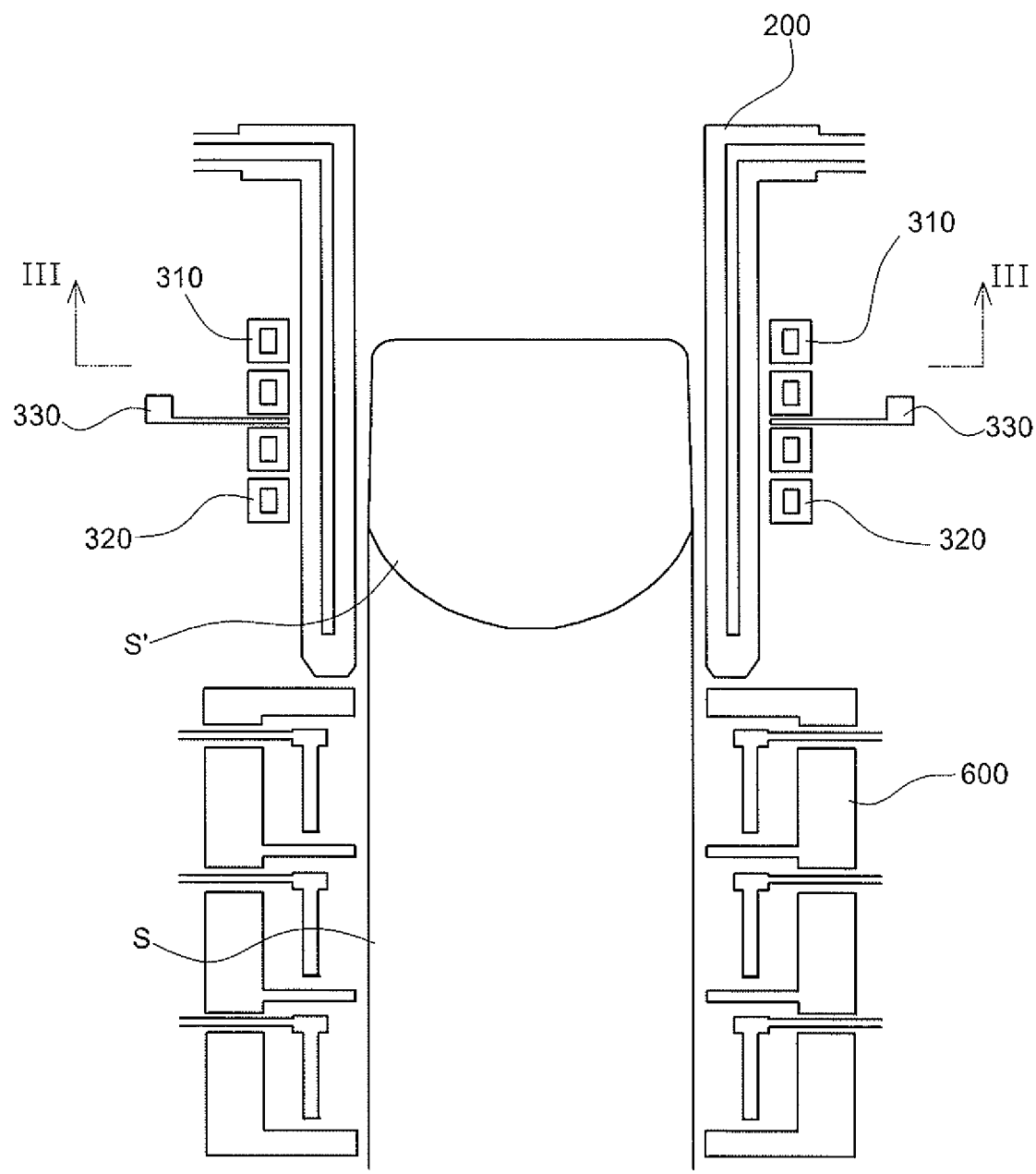
[FIG. 2] is an enlarged view of the essential parts of the apparatus.
Figure 3:
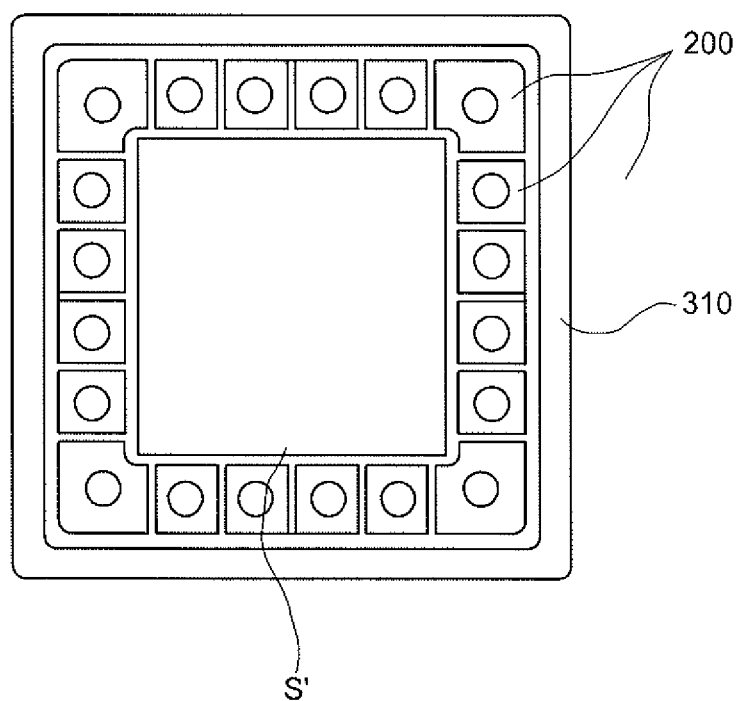
[FIG. 3] is a cross-sectional view taken along the line III-III in FIG. 2 of the apparatus.

Embodiment 1 of the invention is now explained with the help of FIGS. 1-3.

<Overall Structure>

FIG. 1 is a schematic view showing the construction of the first embodiment of the silicon electromagnetic casting apparatus (referred to as apparatus 1 hereafter). FIG. 2 is an enlarged view of the essential parts of the apparatus 1 and FIG. 3 is a cross-sectional view of the apparatus taken along the line III-III in FIG. 2.

Apparatus 11 comprises a furnace vessel 100, a crucible 200 placed within the furnace vessel 100, an induction coil 300 installed on the outer circumference of the crucible 200, a graphite support 400 for mounting a silicon mass S thereon, a vertical motion device 500 for vertically moving the graphite support 400, a temperature control furnace 600 for controlling the solidification of molten silicon S' and a raw material supply unit 700 installed above the crucible 200. These components, except for the induction coil 300, have similar constructions to those of the conventional apparatus.

As for the terms for the silicon, the silicon before it is heated will be called silicon mass S, the silicon in a molten state after heating will be called molten silicon S' and the silicon in a solidified state after cooling will be called silicon ingot.

Structure of the Furnace Vessel

The furnace vessel 100 is an airtight container which is provided in a manner to cover the crucible 200, the induction coil 300, etc.

A feeding inlet 110 is formed in the upper part of the furnace vessel 100 and an exhaust outlet 120 is formed in its lower part. At the time of casting, the inside of the furnace vessel 100 is evacuated to reduce the pressure to 0.1 Torr with help of a vacuum pump (not shown in the drawing) and a predetermined gas (such as argon gas) is injected from the feeding inlet 110 until the pressure becomes equal to the atmospheric pressure.

An insertion hole 130a is drilled in the bottom surface 130 of the furnace vessel 100 and the vertical motion device 500 is inserted in it. This insertion hole 130a should have a sealing material 140 made of rubber in order to make the furnace vessel 100 completely airtight.

Structure of the Crucible

The crucible 200 is made of copper and is cooled by circulating a coolant in its inside.

As shown in FIG. 3, this crucible 200 is split into multiple segments in the circumferential direction to electrically insulate the crucible in the circumferential direction. Electrical insulating material such as mica is preferably inserted between the respective segments of the crucible 200.

Structure of the Induction Coil

A voltage is applied to the induction coil 300 which melts the silicon mass S inside the crucible by induction heating.

The induction coil 300 consists of two induction coils 310 and 320 having different induction frequencies arranged one above the other.

A magnetic shield 330 is installed in between the above mentioned induction coils 310 and 320 of different frequencies in order to shield mutual magnetic action between them.

Furthermore, the terminal voltage applied to each of the induction coils 310 and 320 should preferably be 900 volts or less and more preferably 600 volts or less. This is for the following reasons.

Generally, in the conventional electromagnetic casting method in which the cooled copper crucible 200 is used, the electric power inputted to the induction coils 310 and 320 is transmitted through the crucible 200 as a medium to the molten silicon S' in the crucible 200 with a power ratio of 60-65%. In other words, the induction efficiency becomes 60-65%. As a result, when a voltage of 900 volts is applied to the terminals of the induction coils 310 and 320, the voltage on the surface of the molten silicon S' proportionally reduces to approximately 600 volt. As stated earlier, an arc discharge is formed in the electromagnetic casting apparatus when a voltage of at least 600 volts is applied to adjacent conductive bodies facing each other in an argon gas atmosphere with 1 atmospheric pressure. Accordingly, the terminal voltage of the induction coil which completely suppresses the arc discharge at the time of induction melting is preferably less than 600 volts but to prevent the arc discharge between the surface of the copper crucible 200 and the opposing surface of molten silicon S', the terminal voltage of the coil may even be 900 volt.

Furthermore, the induction coil 320 placed in the lower side is preferably of higher induction frequency. It is also preferable that this induction frequency be at least 25-30 kHz. This is for the following reasons.

Generally, in the process of heating the molten silicon S' by electromagnetic induction, a force pushing the molten silicon S' inwards is generated in the region corresponding to the magnetic field penetration depth in the surface layer of the molten silicon S', due to the relation between the magnetic flux density and the electric current density, so that levitation-melting of the molten silicon S' takes place and the molten silicon S' is stirred by this force. The force that stirs the molten silicon S' is relatively large in the low frequency region, so that a sufficient stirring of the molten silicon S' is attained, while a static molten state is maintained in the high frequency region where the stirring effect is low.

At the same time, in the region corresponding to the magnetic field penetration depth in the surface layer of the molten silicon S', the depth of the surface layer where the electric current flows is large in the low frequency region and hence a wider area is heated in the direction of its depth. On the other hand, in the high frequency region, the depth of the surface layer where the electric current flows is small and hence a smaller area is heated. Accordingly, when the same amount of induction heating is carried out, the heat intensity per unit volume in the wider area that is heated in the low frequency region is relatively low and the heat intensity per unit volume in the smaller area that is heated in the high frequency region was relatively high. In other words, by selecting a high frequency, intense heating can be carried out in the surface layer.

As regards the selection of the induction frequencies for the induction coils, at an induction frequency lower than 25-30 kHz as a boundary, the stirring of molten silicon S' becomes intensive and the convection heat transfer of the molten silicon S' is accelerated, thereby transferring the heat to the solidification interface, so that the solidification interface expands to the lower side and a deep solidification interface is formed. When the silicon solidification continues steadily while forming the deep solidification interface, a temperature difference is generated between the surface layer and the internal portion of the solidified silicon ingot, resulting in generation of an intrinsic material stress in the internal portion of the ingot.

Since the heat intensity of the ingot surface layer is low on the low frequency side, this is insufficient to maintain the temperature in the surface layer of the ingot. Hence, this temperature in the surface layer reduces easily and the temperature difference between the surface layer and the internal portion of the solidified silicon ingot increases. More specifically, in the low frequency region, the solidification interface is deepened due to intensive stirring of the molten silicon S' and to the low heat intensity in the surface layer of the solidified ingot. The solidification interface, which is largely expanded to the lower side, increases the intrinsic material stress in the internal portion of the solidified silicon ingot and crystal defects were generated. As a result, the diffusion length of the minority carrier was decreased and the quality of the polycrystalline silicon as a semiconductor was deteriorated.

On the other hand, in the frequency region higher than 25-30 kHz, the stirring force to the molten silicon S' was weak and thus the molten silicon S' was maintained, the convection heat transfer of the molten silicon S' to the solidification interface was less, the solidification interface was difficult to expand to the lower side and a shallow solidification interface was formed. At the same time, since the heat intensity in the surface layer of the solidified ingot is high due to the high frequency, the temperature difference in the surface layer of the ingot and the inside of the ingot becomes small. Thus, in the process of solidification of the silicon ingot in the high frequency region, the solidification interface was not much expanded toward the lower side and a shallow solidification interface was formed, the temperature difference between the surface layer and the internal part of the ingot was reduced and generation of intrinsic material stress inside the ingot was suppressed. As a result, crystal defects became difficult to generate in the ingot, the diffusion length of the minority carrier was increased and the performance of the solar cells was improved.

In this manner, to improve the productivity in silicon electromagnetic casting by increasing the width of the silicon ingots, an increase in the inductive output is necessary, Particularly, the induction coil on the lower side should preferably be of high induction frequency. And to improve the quality of the semiconductors used for the solar cells, the induction frequency should preferably be 25-30 kHz or more.

<Structure of Other Parts>

The above mentioned temperature control furnace 600 is used to gradually cool and solidify the molten silicon S'. Generally, it maintains a predetermined temperature gradient from the upper part to the lower part and finally cools the molten silicon S' gradually to the specified temperature.

The above mentioned graphite support is a pedestal made of graphite. In the casting operation, the pedestal is positioned at a height equal to that of the lower induction coils with the help of the vertical motion device 500, and the inserted silicon mass S is mounted on this pedestal, which is then moved downwards along the centre line of the furnace vessel 100 to move the molten silicon S' downwards and solidifies it.

The vertical motion device 500 moves the graphite support 400 vertically along the centre line of the furnace vessel 100. A drive unit installed separately (not shown in the drawing) moves it vertically in compliance with the manufacturing conditions.

The raw material supply unit 700 feeds the raw material such as silicon mass S and graphite mass to the crucible 200 from the top. The silicon mass S of a specified weight is fed first and then graphite mass is fed onto the upper surface of the silicon mass. This graphite mass aids heating of the silicon and, when electric current is passed through the induction coils, the graphite mass is first heated up and then, due to its radiant heat, the silicon mass S in the lower part is heated up and its temperature increases. When the temperature of the silicon mass S exceeds a predetermined temperature, the electrical resistance value of the silicon mass S decreases, the induction current in the silicon mass S increases and self-heating starts. The silicon mass S starts self-heating and the graphite mass on the top is simultaneously withdrawn from the crucible 200 in the upward direction.

Although, in this embodiment, the induction coil 300 was composed of two induction coils 310 and 320 one above the other, 3 or more coils may also be used.

Embodiment 2

Figure 4:
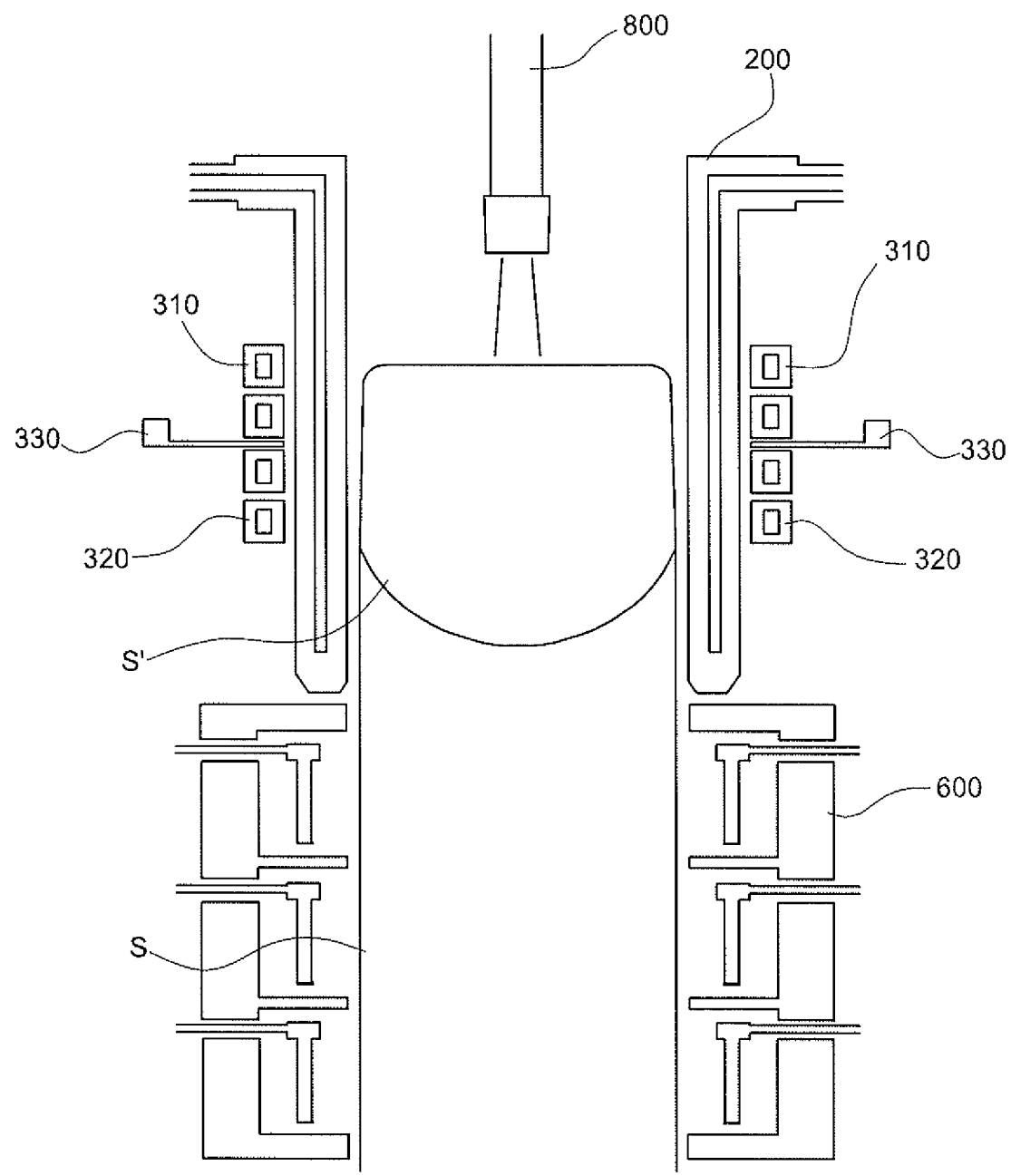
[FIG. 4] is an enlarged view of the essential parts in the second embodiment of the apparatus.
Figure 5:
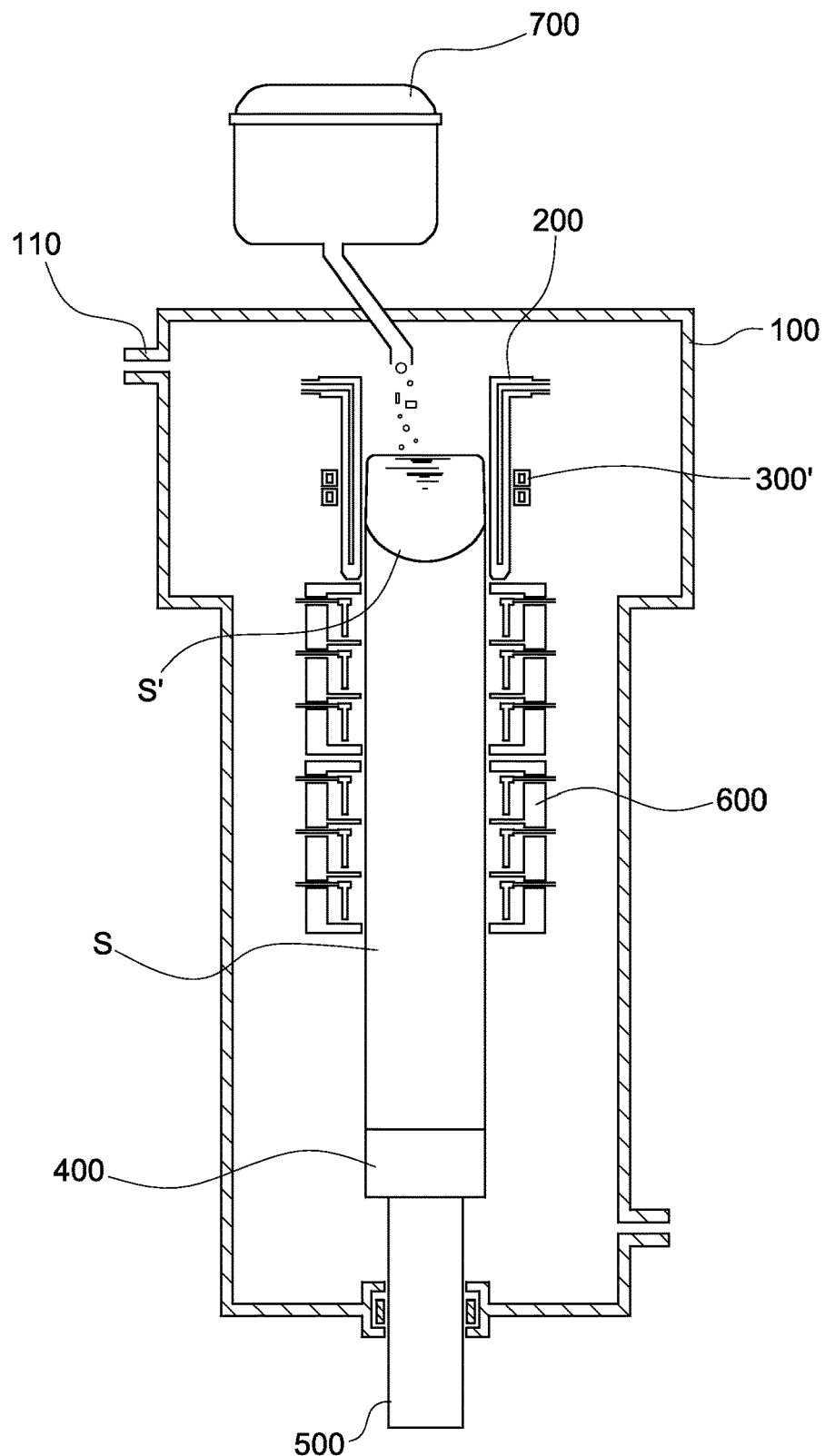
[FIG. 5] is a schematic structure drawing of the conventional apparatus.
Figure 6:
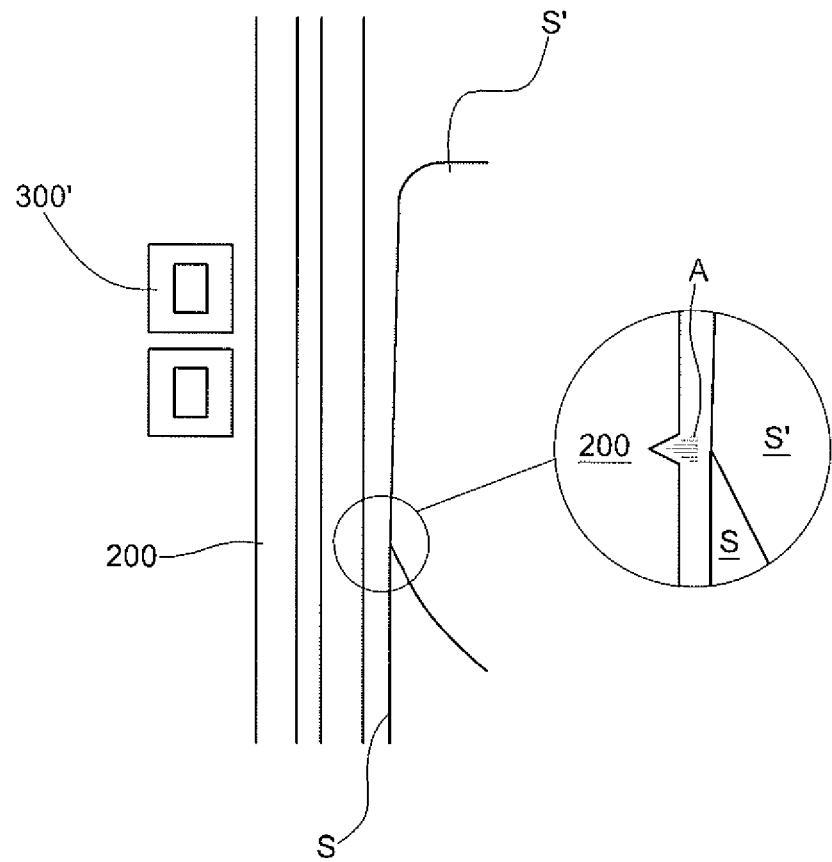
[FIG. 6] is a drawing showing the condition of arc discharge in the conventional apparatus.

Embodiment 2 of the invention is now explained with the help of FIG. 4.

FIG. 4 is an enlarged view of the essential parts in this embodiment of the apparatus 1.

In this embodiment, the crucible 200 is placed inside the furnace vessel 100 and plasma torch 800 is installed on its top.

This plasma torch 800 accelerates the heating of silicon at the time of casting. It is of a cylindrical shape with a diameter of e.g. 10 cm, its negative electrode or the whole torch is water cooled and it can be moved horizontally and vertically.

At the time of casting, the plasma torch 800 is placed in such a way that its tip comes near the silicon mass S. A predetermined gas such as argon is injected in the plasma torch 800 and direct current plasma is ignited between the cathode of the plasma torch 800 and the cathode of the molten silicon S'. Subsequently, silicon heating can be accelerated by gradually increasing the applied voltage along with the induction coils 310 and 320.

Since the structures of the remaining parts are the same as those of the parts mentioned in Embodiment 1 (FIGS. 1-3), they are denoted by the same symbols and no explanation is given.

EXAMPLE 1

In this apparatus 1, silicon mass S is pulled downwards after melting it with the help of the conductive crucible 200, which is divided vertically for electrical insulation and wherein coolant is circulated in its interior portion, and the induction coil 300 which is arranged around the outer circumference of the crucible 200. The example of silicon electromagnetic casting with this apparatus 1, which uses two induction coils 310 and 320 of different induction frequencies, is given below.

In this example, similarly to FIG. 1, within the furnace vessel 100 whose internal pressure can be controlled, the crucible 200, the two induction coils 310 and 320 arranged one above the other around the outer circumference of the copper crucible 200, and the temperature control furnace 600 which controls the temperature for the solidification of silicon mass S which was placed right below the said crucible 200, the vertical motion device 500, which moves the graphite support 400 vertically, was installed and the silicon mass S was continuously pulled downwards.

A raw material supply unit 700, which supplies silicon mass S, graphite mass etc., was installed on the upper side of the furnace vessel. The graphite mass was fed from the upper side to the level of the induction coils 300 in the crucible 200 at the time of initial melting of the silicon mass S and was induction-heated. This is used to accelerate the heating of the silicon mass S.

The cross-section in the casting direction of the silicon mass S was square-shaped and its width was 35 cm. Accordingly, the horizontal cross-section of the crucible 200 was also square-shaped with a side length of 35 cm and an outer side length of 41.6 cm. The number of divisions for vertical electrical insulation of the crucible 200 was 60. That is, the crucible 200 was divided into 60 segments and the length of each segment was 70 cm. A coolant was circulated through its internal part and mica was inserted between the segments as an electrical insulation material. The total flow volume of the coolant used inside the crucible 200 was 500 L per minute.

Furthermore, two induction coils 310 and 320 were placed one above the other and the induction coil 310 placed on the upper side was 2 turns in a square shape with an inner side length of 42.6 cm and a height of 15 cm. This was connected to the induction power supply with the maximum output of 350 kW and the induction frequency was set to 10 kHz. The induction coil 320 placed on the lower side had the same form as the induction coil 310 placed on the upper side. But this was connected to the induction power supply with the maximum output of 150 kW and the induction frequency was set to 35 kHz. These two induction coils 310 and 320 were positioned at the centre of the height of crucible 200, a 3 mm thick copper magnetic shield 330 was placed in between the induction coil 310 placed on the upper side and the induction coil 320 placed on the lower side and the outer circumference of this copper magnetic shield 330 was cooled using a corrugated tube.

The operating procedure for this example is as follows. Firstly, the graphite support 400 having a square-shaped cross-section normal to the downward direction and a side length of 35 cm is mounted on the vertical motion device 500 and is inserted into the crucible 200 in such a way that its top surface levels with the lower edge of the induction coil 320 placed on the lower side. Then, a silicon mass S of 50 kg was placed on the top surface of the graphite support 400. The graphite mass having a square-shaped cross-section normal to the downward direction, a side length of 30 cm and height of 7 cm was inserted from the top of the crucible 200 until it was located by 2 cm above the top surface of the inserted silicon mass S.

Then, the pressure within the furnace vessel 100 was decreased to 0.1 Torr with the help of a vacuum pump and then argon gas was injected into the furnace vessel 100 until the pressure became equal to the atmospheric pressure. This was followed by sequentially increasing the inductive output up to 200 kW by applying electric voltage to the induction coil 310 on the upper side having an induction frequency of 10 kHz. Next, the inductive output was increased up to 100 kW by applying voltage to the induction coil 320 on the lower side having an induction frequency of 35 kHz. The terminal voltage of the induction coil 310 on the upper side was 170 volts and the terminal voltage of the induction coil 320 on the lower side was 280 volts in case of the above mentioned inductive output.

Thus, when electric current was passed through the induction coils 310 and 320, the temperature of the graphite mass placed on top of the silicon mass S increased and it turned red since induction heating took place. Due to the radiant heat of the graphite mass which turned red, the temperature of the silicon mass S, which was placed above it, increased. As the temperature of the said silicon mass S became approximately 500° C., the electrical resistance value of the silicon mass S decreased, the induction current in the silicon mass S increased and self-heating started. When the silicon mass S started self-heating, the graphite mass was simultaneously withdrawn from the cooled crucible 200 in the upward direction.

Further, melting of silicon was accelerated by increasing the inductive output of the induction coil 310 placed on the upper side up to 350 kW, and of the induction coil 320 placed on the lower side up to 150 kW, respectively. The temperature of the silicon mass S which had started self-heating increased further and it soon melted completely. The molten silicon S' did not come into contact with the cooled crucible 200 since electromagnetic force acted on the inner wall of the crucible 200 which faced the molten silicon S'. The maximum terminal voltage of the induction coil 310 on the upper side was 280 volts and that of the induction coil 320 on the lower side was 320 volts in case of the increased inductive output mentioned above.

When the initially inserted silicon melted completely and maintained its stable state, the temperature control furnace 600 of the silicon ingots, which was placed right below the crucible 200, was increased in the temperature and a thermal gradient of approximately 35° C./cm in the downward direction was maintained.

Casting was started by moving downwards the vertical motion device 500 which held the molten silicon S' while continuously feeding the raw silicon material with a granulation range of 1 to 20 mm to the crucible 200 from the raw material supply device 700 placed above the crucible 200. When the vertical motion device 500 started the downward movement and the molten silicon S' came to a level lower than the lower edge of the induction coil 320, the electromagnetic force acting on the molten silicon S' decreased and the molten silicon S' was cooled and solidified. At this time, since the surface of the solidified silicon ingot came near the induction coil 320 placed on the lower side and received the inductive effect of the induction coil 320, the silicon ingot became red hot and was not be cooled immediately.

Thus, continuous casting was carried out in which continuous supply of the silicon raw material and continuous solidification of the silicon mass S took place simultaneously. In this example, the casting speed was 2.0 mm per minute, the induction power output at the time of steady casting was approximately 260 kW in case of the induction coil 310 on the upper side and approximately 80 kW in case of the induction coil 320 on the lower side. The terminal voltage was approximately 200 volts in the case of the induction coil 310 on the upper side and approximately 250 volts in the case of the induction coil 320 on the lower side. Casting was stopped once the total length of the ingot became 200 cm.

After cooling the ingot that was cast with the above mentioned procedure to the room temperature, the ingot was removed from the vessel and the inner surface of the crucible 200 was inspected. As a result, there was no trace of arc discharge and the shape of the inner surface of the crucible 200 was as flat as before.

Further, for the test production of solar cells with the silicon ingots, substrates used in the solar cells were manufactured and the efficiency of the solar cells was tested. More specifically, a silicon block having a square-shaped 15 cm cross-section and a length of 40 cm was cut out with the help of a diamond cutting machine and this was processed to make a 200 micron meter thick silicon polycrystalline substrate by wire-saw slicing. Further, 100 sheets of the said silicon polycrystalline substrate were taken and were used on a trial basis in the solar cells, Hydrogen passivation method was used in the process of test production of the solar cells and the average value of the efficiency of photoelectric conversion of the solar cells for 100 sheets was 15.1%. It was confirmed from this example that the silicon ingots manufactured using this invention could provide solar cells substrates of high quality.

EXAMPLE 2

In this apparatus 1, silicon mass S is pulled downwards after melting it with the help of a conductive crucible 200, which is divided vertically for electrical insulation and wherein a coolant is circulated in its interior portion, and the induction coil 300 arranged around the outer periphery of the crucible 200. The example of silicon electromagnetic casting with this apparatus 1, which used two induction coils 310 and 320 of different induction frequencies and the plasma torch 800, was performed as follows.

In this example, as shown in FIG. 4, crucible 200 was placed within the furnace vessel 100 whose internal pressure can be controlled and two induction coils 310 and 320 were arranged one above the other around the outer periphery of the copper crucible 200. The temperature control furnace 600 which controls the temperature for the solidification of the silicon mass S was placed right below the crucible 200, the vertical motion device 500, which moves the graphite support 400 vertically, was installed and the silicon mass S was continuously pulled downwards.

A raw material supply unit 700, which supplies silicon mass S, graphite mass etc., was installed on the upper side of the furnace vessel. The graphite mass was fed from the upper side up to the level of the induction coils 300 in the crucible 200 at the time of initial melting of the silicon mass S and was induction-heated. This is used to accelerate the heating of the silicon mass S.

Further, a plasma torch 800 was installed over the crucible 200 and plasma jet heating was carried out from the upper side of the molten silicon S'.

The cross-section normal to the casting direction of the silicon mass S is square-shaped and its side length is 51 cm. Accordingly, the horizontal cross-section of the crucible 200 was also square-shaped with an inner side length of 51 cm and an outer side length of 57 cm. The number of divisions for vertical electrical insulation of the crucible 200 was 84. That is, the crucible 200 was divided into 84 segments and the length of each segment was 80 cm. A coolant was circulated in its internal part and mica was inserted between the segments as an electrical insulation material. The total flow volume of the coolant used inside the crucible 200 was 700 L per minute.

Furthermore, two induction coils 310 and 320 were placed one above the other. The induction coil 310 placed on the upper side was 2 turns in a square form with an inner side length of 58 cm and a height of 15 cm, and connected to the induction power supply with the maximum output of 550 kW and the induction frequency was set to 10 kHz. The induction coil 320 placed on the lower side had the same form as the induction coil 310 placed on the upper side. But this was connected to the induction power supply with the maximum output of 200 kW and the induction frequency was set to 35 kHz. These two induction coils 310 and 320 were positioned at the centre of the height of crucible 200, a 3 mm thick copper magnetic shield 330 was placed in between the induction coil 310 placed on the upper side and the induction coil 320 placed on the lower side and the outer circumference of this copper magnetic shield 330 was cooled using a corrugated tube.

In order to carry out plasma jet heating from the upper side of the molten silicon S', the plasma torch 800 was connected to a direct current power supply of 100 kW where the molten silicon was the anode. The plasma torch 800 was of a cylindrical shape with a diameter of 10 cm, its negative electrode and the whole torch were water cooled and the plasma torch 800 was the type which can be moved horizontally and vertically.

The operating procedure for this example is as follows. Firstly, the graphite support 400 having a square-shaped cross-section normal to the downward direction and a side length of 51 cm is mounted on the vertical motion device 500 and is inserted in the crucible 200 in such a way that its top surface levels with the lower edge of the induction coil 320 placed on the lower side. Then, a silicon mass S of 110 kg was placed on the top surface of the graphite support 400.

Next, the plasma torch 800 was moved downwards in such a way that its tip came near the silicon mass S. 250 L of argon was injected into the plasma torch 800 per minute and direct current plasma was ignited between the cathode of the plasma torch 800 and the cathode of the molten silicon S'. After the plasma ignition was confirmed, voltage was applied and electric current was passed through the induction coils 310 and 320.

Then, melting of the silicon mass S was accelerated by gradually increasing the applied electric power after plasma ignition and application of voltage on the induction coil was started. The output of the plasma jet was increased up to the electric current of 7000 amperes and the voltage of 125 volt. A maximum induction frequency of 10 kHz, a maximum inductive output of 550 kW and a maximum coil terminal voltage of 380 volts were applied to the induction coil 310 placed on the upper side. Similarly, a maximum induction frequency of 35 kHz, a maximum inductive output of 200 kW and a maximum coil terminal voltage of 560 volts were applied to the induction coil 320 placed on the lower side.

Temperature increase and melting of the silicon mass S were accelerated and the silicon mass S soon melted completely. Silicon raw material was further charged from the raw material supply device 700 until the quantity of the molten silicon S' reached 180 kg. Under the irradiation of the plasma jet 800, the molten silicon S' which had undergone induction melting in the crucible 200 was now in stable condition and the molten silicon was kept away from contact with the cooled crucible 200 under the electromagnetic force acted on the inner wall of the crucible 200 facing the molten silicon S'.

When the initial melting process of the silicon mass S was completed and the molten silicon S' maintained its stable state, the temperature control furnace 600 for the silicon ingot, which was placed right below the crucible 200, was caused to increase its temperature and a thermal gradient of approximately 35° C./cm in the downward direction was maintained.

Casting was started by moving downwards the vertical motion device 500 which holds the molten silicon S' while continuously feeding raw silicon material with a granulation range of 1 to 20 mm to the crucible 200 from the raw material supply device 700 placed above the crucible 200. When the vertical motion device 500 started downward movement and the molten silicon S' came to a lower level than the lower edge of the induction coil 320, the electromagnetic force acting on the molten silicon S' decreased and in turn, cooled and solidified the molten silicon S'. At this time, since the surface of the solidified silicon ingot was near the induction coil 320 placed on the lower side and received the inductive effect from the induction coil 320 and hence it became red hot and was not quenched quickly.

Thus, continuous casting was carried out wherein continuous supply of the raw material and continuous solidification of the silicon ingot took place simultaneously. In this example, the casting speed was 1.7 mm per minute, the induction power output at the time of steady casting was approximately 80 kW in case of plasma jet, approximately 350 kW in case of the induction coil 310 on the upper side and approximately 150 kW in case of the induction coil 320 on the lower side. The terminal voltage was approximately 250 volts in case of the induction coil 310 on the upper side and approximately 470 volts in case of the induction coil 320 on the lower side. Casting was stopped once the total length of the ingot of 200 cm was reached.

After cooling the ingot that was cast according to the above mentioned procedure to room temperature, the inner surface of the crucible 200 was inspected. As a result, there were no traces of arc discharge and the shape of the inner surface of the crucible 200 was as flat as before.

Further, for the test production of solar cells with the silicon ingots, substrates for solar cells were manufactured and the efficiency of the solar cells was tested. More specifically, square-shaped silicon polycrystalline substrates having a surface area of 15 cm square meters and a thickness of 200 micron meters were prepared from the ingot and test production of solar cells was carried out. 100 sheets of the substrate, which were taken out, were used for this test production. The average value of the efficiency of photoelectric conversion of the solar cells for 100 sheets was 15.2%. It was confirmed from this example that the silicon ingots manufactured according to this invention could provide solar cells substrates of high quality.

INDUSTRIAL APPLICABILITY

This invention can find applicability in the silicon electromagnetic casting in which silicon mass is molten by induction heating to produce cast silicon mass in order to produce high quality silicon ingots to be used as silicon substrates for solar cells.

The invention claimed is:

1. A silicon electromagnetic casting process comprising the steps of supplying a silicon into a conductive crucible disposed within a furnace vessel, the conductive crucible having a plurality of induction coils surrounding the outer circumference of the conductive crucible; circulating a coolant through a plurality of electrically insulated segments of the conductive crucible; supplying a prescribed gas to the interior of the furnace vessel to maintain a constant pressure within the furnace vessel; and applying a terminal voltage to the plurality of induction coils to melt the silicon by induction heating and form a molten silicon solidified at a solidification interface; characterized by the steps of arranging the plurality of induction coils one above another from a lowest-disposed induction coil to a highest-disposed induction coil, supplying a different induction frequency to each of the plurality of induction coils; supplying a high induction frequency of at least 25 kHz to the lowest-disposed induction coil of the plurality of induction coils with the high induction frequency suppressing stirring of the molten silicon at the solidification interface and maintaining a static state of the molten silicon at the solidification interface; and solidifying the molten silicon.

2. The process of claim 1 further comprising the step of placing a magnetic shield between the plurality of induction coils.

3. The process of claim 1 wherein the step of applying a terminal voltage to the plurality of induction coils is applied at a terminal voltage of 900 volts or less.

4. The process of claim 1 wherein the step of applying a terminal voltage to the plurality of induction coils is applied at a terminal voltage of 600 volts or less.

5. The process of claim 1 further comprising the step of plasma jet heating the molten silicon.

* * * * *